(12) United States Patent
Karppanen

(10) Patent No.: US 11,620,102 B1
(45) Date of Patent: Apr. 4, 2023

(54) VOICE NAVIGATION FOR NETWORK-CONNECTED DEVICE BROWSERS

(71) Applicant: Amazon Technologies, Inc., Seattle, WA (US)

(72) Inventor: Jari Karppanen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 315 days.

(21) Appl. No.: 16/143,371

(22) Filed: Sep. 26, 2018

(51) Int. Cl.
*G06F 3/16* (2006.01)
*G06N 20/00* (2019.01)
*G06F 3/0481* (2022.01)
*G06F 40/14* (2020.01)

(52) U.S. Cl.
CPC ............ *G06F 3/167* (2013.01); *G06F 3/0481* (2013.01); *G06F 40/14* (2020.01); *G06N 20/00* (2019.01)

(58) Field of Classification Search
CPC .... G06F 3/167; G06F 17/2247; G06F 3/0481; G06N 20/00
See application file for complete search history.

(56) References Cited

U.S. PATENT DOCUMENTS

| | | | |
|---|---|---|---|
| 6,725,424 B1 * | 4/2004 | Schwerdtfeger .... | G06F 16/9577 715/239 |
| 9,940,396 B1 * | 4/2018 | Willhoit .................. | H04L 67/10 |
| 10,423,709 B1 * | 9/2019 | Bradley ................... | G06F 40/16 |
| 2002/0010715 A1 * | 1/2002 | Chinn .................... | G06F 16/957 715/236 |
| 2002/0062216 A1 * | 5/2002 | Guenther ............ | H04M 3/4938 704/270.1 |
| 2002/0174147 A1 * | 11/2002 | Wang .................... | G06F 16/957 715/234 |
| 2010/0094635 A1 * | 4/2010 | Bermudez Perez .... | G06F 16/95 704/270.1 |
| 2014/0089772 A1 * | 3/2014 | Shetty ................... | G06F 16/958 715/206 |
| 2014/0278440 A1 * | 9/2014 | Chung .................... | G06F 3/167 704/275 |
| 2016/0019464 A1 * | 1/2016 | Madhavan ............. | G06N 5/047 706/11 |
| 2017/0269816 A1 * | 9/2017 | Bradley .............. | G06F 17/2247 |
| 2019/0347067 A1 * | 11/2019 | Jolfaei .................... | G06F 3/167 |

* cited by examiner

*Primary Examiner* — Tadesse Hailu
(74) *Attorney, Agent, or Firm* — Davis Wright Tremaine LLP

(57) ABSTRACT

A context evaluation module of a network-connected device detects presentation of a webpage via the network-connected device. The context evaluation module obtains a document object model of the webpage and identifies a set of navigation links. The context evaluation module selects a navigation link from the set and determines a state change of the webpage. Based on the state change, the context evaluation module modifies code of the webpage to associate contextual information based on the state change with the navigation link. This enables fulfillment of a voice command to perform the state change by using the contextual information to match the voice command to the navigation link.

4 Claims, 6 Drawing Sheets

VOICE NAVIGATION FOR NETWORK-CONNECTED DEVICE BROWSERS

BACKGROUND

As network-connected devices become more prolific, users may utilize these devices to access information from a variety of different sources. For instance, network-connected devices may present users with information related to an item of interest. Users may interact with these network-connected devices using their own voices, whereby users may speak a command to the network-connected devices to cause these devices to execute the command. However, voice navigation through these network-connected devices is problematic, as navigation links presented via these network-connected devices may not have any reasonable content to identify what the navigation links direct users to if executed. This may make it difficult for network-connected devices to determine what operations to perform in response to commands from users.

BRIEF DESCRIPTION OF THE DRAWINGS

Various techniques will be described with reference to the drawings, in which.

DETAILED DESCRIPTION

Figure 1:
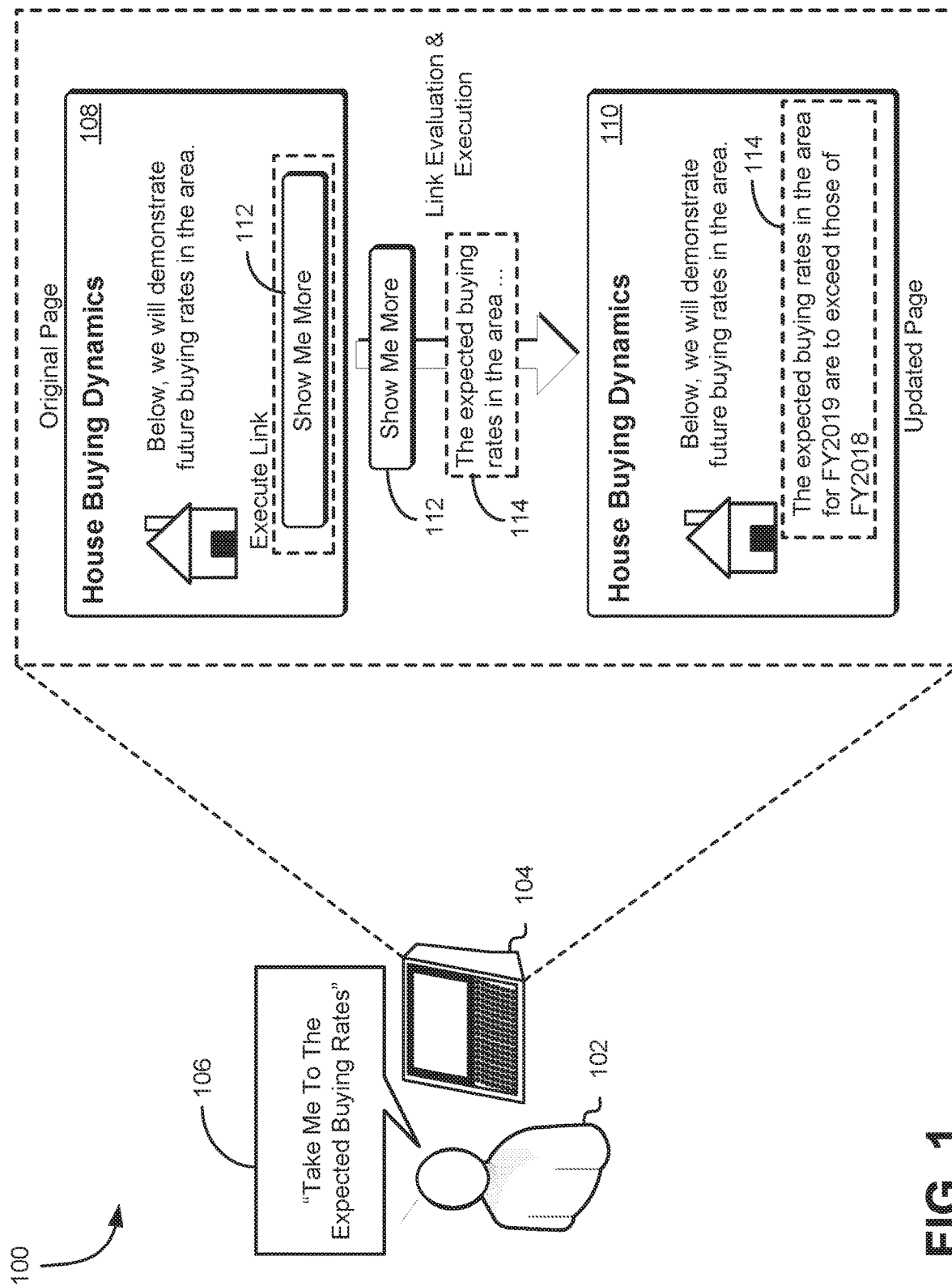
FIG. 1 shows an illustrative example of a system in which various embodiments can be implemented.

Techniques described and suggested herein relate to the evaluation of outcomes resulting from execution of navigation links on a site presented via a network-connected device to enable interpretation of voice commands for execution of the navigation links. In an example, a network-connected device detects that a webpage or other content has been loaded on to a display element of the network-connected device. For instance, a user of the network-connected device may issue a voice command to access a particular webpage or other content available over a network, such as the Internet. In response to detecting the presentation of a webpage or other content onto the display element of the network-connected device, the network-connected device may construct a DOM or other programming interface corresponding to the webpage or other content presented via the display element. The DOM or other programming interface may represent the various elements of the webpage or other content, including headers, body text, images, and interactive elements, including navigation links that, if selected, may cause the network-connected device to navigate to other webpages or other content.

In one example, the network-connected device identifies a navigation link via a DOM of the webpage and generates a copy of the DOM for evaluation. The network-connected device may execute the navigation link to determine what impact execution of the navigation link will have on the DOM of the webpage. For instance, the network-connected device may identify new DOM elements as a result of execution of the navigation link. These new DOM elements may include new headers and text, new images, additional navigation links, and the like. Alternatively, the navigation link may direct the network-connected device to a new webpage. If execution of a navigation link results in presentation of a new webpage, the network-connected device may generate a new DOM representing this new webpage and perform additional evaluation of this new DOM. In an example, if a webpage includes multiple navigation links, the network-connected device performs multiple evaluations of DOM changes in parallel by maintaining each partial DOM bifurcation in memory. Based on these evaluations, the network-connected device may generate a DOM for the webpage that includes various forks where navigation link nodes are located, where the forks may include new nodes representing additional content presentable through execution of the navigation links. Additionally, or alternatively, the network-connected device may generate metadata associated with each navigation link. This metadata may include keywords, phrases, and other information that may be used to determine the context of the navigation link.

In one example, the network-connected device evaluates the various changes to the DOM for the website to determine the content and context of these various changes. Based on the content and context of these various changes to the DOM, the network-connected device may determine what keywords or commands may correspond to a desire to execute each of the navigation links of the webpage. For instance, if a webpage includes a navigation link that would direct a user to a new webpage that includes information about generational differences in house buying, the network-connected device may evaluate the DOM elements corresponding to this new webpage to determine that the navigation link is associated with information regarding these generational differences in house buying. The network-connected device may interpret a voice command to see more information related to generational differences in house buying as a request to execute the navigation link. As another example, if a webpage includes a navigation link that specifies "show more," the network-connected device may determine the effect of selecting the navigation link on the webpage and, based on the changes to the webpage, update the data associated with the navigation link to cause voice commands related to content presentable through execution of the navigation link to be registered as requests to execute the navigation link.

In one example, the network-connected device transmits metadata created as a result of evaluation of the webpage and other webpages and content accessed via navigation links of the original webpage to a remote service. The remote service may cache this metadata for use by other network-connected devices should these other network-connected devices access the same webpage. A network-connected device may obtain this metadata and use the metadata, as well as initial response headers (e.g., e-tag, content length, etc.) to verify that the loaded webpage would be identical if navigated to. Any changes to the webpages may be used to update the metadata, which may be stored by the remote service for use by other network-connected devices.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For instance, because a network-connected device may store metadata created as a result of evaluation of the webpage and other webpages and content accessed via navigation links of the original webpage to a remote service, other network-connected devices accessing the webpage need not perform the same evaluation performed by the first network-connected device, thereby reducing the bandwidth usage of each subsequent network-connected device. Further, because a network-connected device can proactively update the content of a webpage based on information accessible via selection of a navigation link, the network-connected device can re-label navigation links using this information such that if a user invokes a "navigate" or similar voice command, the network-connected device may present keywords in conjunction with the navigation links. This may enable users to visually determine which navigation link to invoke.

FIG. 1 shows an illustrative example of a system 100 in which various embodiments can be implemented. In the system 100, a user 102 of a network-connected device 104 may access, via the network-connected device 104, a webpage or other information presentable through a display element of the network-connected device 104. The network-connected device 104 may be an electronic device that includes a mechanism for communication (e.g. WiFi, Bluetooth®, Near Field Communication (NFC), etc.), a mechanism for determining its physical location, and a mechanism for processing and executing commands received from a user 102 or from a software container instance invoked by a network-connected device service. The network-connected device 104 may provide state information to the network-connected device service over time. For instance, the network-connected device 104 may transmit, using HTTP, MQTT, or other communications protocols, state information for the device 104 to the network-connected device service. The network-connected device service may store this state information in one or more device records. The one or more device records may function as state machines for the network-connected device 104, whereby the device records may store a data structure used to track the state of the network-connected device 104 as the network-connected device 104 transmits state information to the network-connected device service. While network-connected devices with integrated browsers are used extensively throughout the present disclosure for the purpose of illustration, features described herein may be performed by other devices and/or applications that may utilize a split architecture (e.g., a certain amount of processing is performed by a remote service to improve performance of the application).

In an embodiment, the user 102 utilizes the network-connected device 104 to navigate to a webpage 108 or other information presentable via the display element of the network-connected device 104. For instance, the user 102 may issue a voice command to the network-connected device 104 to access a particular webpage, whereby the voice command may specify a header or other information usable by the network-connected device 104 to identify the desired webpage 108 that is to be accessed. As an example, the user 102 may request access to a popular news site by name (e.g., "take me to the local newspaper site," etc.). This may cause the network-connected device 104 to identify the Uniform Resource Identifier (URI) corresponding to the requested webpage 108. The network-connected device 104 may utilize this URI, in conjunction with a Domain Name System (DNS) server, to identify a server that maintains the webpages associated with the URI. This server may transmit the data associated with the webpages to the network-connected device 104, which may present the webpages to the user 102 via a display element of the network-connected device 104, fulfilling the user's 102 request. While webpages are used extensively throughout the present disclosure for the purpose of illustration, other content may be utilized with the techniques described herein. For instance, other content may include digital text documents, applications, video games, electronic mail messages, text messages, and the like.

The webpage 108 may include HyperText Markup Language (HTML) code, Cascading Style Sheets (CSS), JavaScript, and/or other technologies usable to present, via a display element, various elements of the webpage in a manner that may be understandable to a user 102. For instance, a webpage 108 may include a variety of text and images that may be readable by a human. A webpage 108 may be divided into various headings that may enable users to skim and find what is interesting on the webpage 108. Under each heading, the webpage 108 may include text and images related to the heading. In an embodiment, the webpage 108 includes one or more navigation links 112 usable to access other webpages associated with the webpage 108 or to cause additional information and content to be presented via the webpage 108. For instance, a navigation link 112, if selected, may cause the webpage 108 to be updated to present additional information. Alternatively, a navigation link 112, if selected, may cause the network-connected device 104 to transmit a request to a DNS server to identify a server that maintains the webpages associated with a URI encoded into the navigation link 112. This may cause the network-connected device 104 to redirect the user 102 to another webpage, which may include new information presentable via the display element of the network-connected device 104.

In an embodiment, once the webpage 108 has been loaded by the network-connected device 104, the network-connected device 104 generates a DOM of the webpage 108. The DOM of the webpage 108 may include a variety of nodes and node class types corresponding to the various elements of the webpage 108. For instance, the DOM may specify a hierarchy of nodes corresponding to the various elements of the webpage 108. This may include a top-level root element node, which may serve as the parent node to various child nodes within the DOM tree that represents the webpage 108. The child nodes stemming from the root node of the DOM tree may correspond to headers within the webpage 108, text presented within the body of the webpage 108, JavaScript that may be executed by the network-connected device 104 to present information and other material on the webpage 108, and the like. In an embodiment, the DOM tree for the webpage 108 includes one or more nodes corresponding to navigation links presentable via the webpage 108. For example, the DOM tree for the webpage 108 may include a child node that serves as a parent to an attribute node corresponding to a hypertext reference (e.g., href) and a text node that includes the text presentable on the webpage for the navigation link. In an embodiment, the child node serving as the parent for the attribute node and the text node includes an anchor tag that defines a hyperlink (e.g., <a>). As another example, the DOM tree for the webpage 108 may include one or more JavaScript or CSS elements that, when executed, cause navigation links to be presented via the webpage 108 (e.g., a "Show More" button for displaying additional information, etc.). While DOM trees are used extensively throughout the present disclosure for the purpose of illustration, other representations of content may be used to evaluate the content of a webpage. Other representations of content may include Browser Object Models (BOM) and other application programming interfaces (API) that describe the structure of the webpage or of other content (e.g., word processing files, electronic presentation files, spreadsheets, electronic mail messages, text messages, multimedia files and messages, etc.).

In an embodiment, the network-connected device 104 evaluates the DOM tree of the webpage 108 to identify any navigation links that may be presented on the webpage 108. For instance, the network-connected device 104 may search the DOM tree for any nodes corresponding to anchor tags or JavaScript/CSS elements that, when executed, cause navigation links to be presented via the webpage 108. If the network-connected device 104 identifies one or more navigation links present within the DOM tree of the webpage 108, the network-connected device 104 may generate a copy of the DOM tree for each identified navigation link and determine the impact of executing each navigation link. In an embodiment, the network-connected device 104 utilizes copy-on-write techniques to fork a copy of the DOM tree to evaluate each of the navigation links in parallel. For instance, the network-connected device 104 may keep each navigation link fork in memory for execution and modification of the copy of the original DOM tree of the webpage 108.

The network-connected device 104 may execute an identified navigation link to determine the changes to the copy of the DOM tree resulting from such execution of the navigation link. For instance, if execution of a navigation link 112 results in additional information 114 being presented on the webpage 108, the copy of the DOM tree corresponding to execution of the navigation link 112 may be updated to include new nodes representing this new information 114. Alternatively, if execution of a navigation link results in a new webpage 110 being presented, the network-connected device 104 may generate a new DOM tree corresponding to this new webpage 110. In an embodiment, the network-connected device 104 evaluates the parallel DOM trees generated based on the execution of the various navigation links on the webpage 108 to identify information accessible through execution of the various navigation links. For instance, the network-connected device 104 may evaluate new header nodes resulting from execution of a navigation link to determine the context of the additional information accessible through this execution of the navigation link. Additionally, or alternatively, the network-connected device 104 may evaluate any new DOM tree nodes that specify text corresponding to additional information accessible through execution of the navigation link to identify the context of this additional information.

Based on the individual changes to the DOM tree copies, the network-connected device 104 may update the original DOM tree of the webpage 108 to incorporate the changes identified in the DOM tree copies resulting from execution of the various navigation links of the webpage 108. For instance, in an embodiment, the network-connected device 104 can change the DOM node class types to allow links to alternative versions of the DOM tree (e.g., copies) through use of identifier tokens. This may allow multiple separate DOM trees that share most of the various nodes of the webpage 108, with the original DOM tree having default or empty identifier tokens. Using the updated DOM tree for the webpage 108, the network-connected device 104 may identify new voice commands usable to identify and execute any of the navigation links 112 presented on the webpage 108. For instance, if execution of the navigation link 112 would result in additional information being presented about the expected buying rates in an area, the user 102 may issue a voice command 106 that indicates a desire to access this additional information (e.g., the "Take me to the expected buying rates" command illustrated in FIG. 1). In response to the voice command 106, the network-connected device 104 may evaluate the updated DOM tree for the webpage 108 to determine which navigation link is to be executed to access the requested information. The network-connected device 104 may execute the corresponding navigation link and present, via the display element of the network-connected device 104, the requested information 114, fulfilling the user's request.

In an embodiment, the network-connected device 104 transmits metadata associated with the evaluation of the webpage 108 and corresponding navigation links to a network-connected device service or other remote service. The network-connected device service or other remote service may cache or otherwise store this metadata for use by other network-connected devices or clients accessing the webpage 108. For instance, a network-connected device accessing the webpage 108 may transmit a request to the network-connected device service or other remote service to determine whether any metadata associated with the webpage 108 is available for use. If so, the network-connected device may obtain this metadata from the network-connected device service or other remote service. The network-connected device may use the metadata and initial response headers (e.g., e-tag, content length, etc.) to verify that the additional information accessible via the navigation links of the webpage 108 would be the same if navigated to.

In an embodiment, the network-connected device 104 can replace text associated with a navigation link based on the additional information garnered from evaluation of the navigation link through DOM tree manipulation. For example, the network-connected device 104 may replace the original text of a navigation link 112 (e.g., "Show Me More") with new text based on the additional information garnered from execution of the navigation link (e.g., "Expected Buying Rates"), resulting in a new navigation link. Thus, a user 102 evaluating the webpage via the display element of the network-connected device 104 may understand what information may be accessed through execution of the updated navigation link. In an embodiment, the network-connected device 104 can present, via the display element, keywords in the vicinity of each navigation link to allow the user 102 to determine which navigation link to execute. These keywords may correspond to the additional information accessible through execution of each of the navigation links presented on the webpage 108. For example, if the user 102 utilizes the voice command "navigate" or other similar command that represents a request to execute the navigation link 112, the network-connected device 104 may present, via the device element of the network-connected device 104, the keywords corresponding to each navigation link. This may enable the user 102 to issue a command to execute a particular navigation link by using a keyword or set of keywords associated with the particular navigation link.

In an embodiment, the network-connected device 104 utilizes machine learning techniques, such as supervised learning techniques to determine the contextual changes to the webpage resulting from changes to the original DOM tree in response to invocation of navigation links presented on the webpage. A machine learning algorithm may utilize, as input, updated DOM trees of a webpage garnered by the network-connected device 104 through execution of the various navigation links of a webpage. Further, in some instances, the machine learning algorithm may also utilize metadata for the webpage generated by other network-connected devices and obtained from a network-connected device service or other remote service. In some examples, the machine learning algorithm may utilize prediction metadata for other similar webpages as input. Other input to the machine learning algorithm may include a user's response based on information presented through execution of a navigation link, as well as a user's voice command that resulted in invocation of any of the navigation links of the webpage. A machine learning algorithm may, at any time, utilize one or more sample vectors to perform one or more simulations to determine whether the functions utilized by the network-connected device 104 to determine execution of navigation links based on voice commands issued by users of the network-connected device 104 are producing correct and accurate results and/or to refine the one or more functions utilized by the network-connected device 104 to produce correct and accurate results. For instance, during initialization of the machine learning algorithm, the network-connected device 104 may provide the machine learning algorithm with one or more sample vectors and analytical results (e.g., desired outcomes) that should be obtained based at least in part on these one or more sample vectors. The machine learning algorithm, based at least in part on this exercise, may adjust the functions utilized by the network-connected device 104 to analyze the vectors corresponding to evaluation of information accessed through execution of the navigation links and of modifications to the DOM tree resulting from execution of the navigation links.

The machine learning algorithm may receive input from one or more analysts employed by the a network-connected device service to analyze the results from the one or more analyses performed by the network-connected device 104 through use of the one or more functions described above. For instance, an analyst may review the metadata generated as a result of execution of the navigation links of a webpage and the one or more vectors generated by the network-connected device 104 to determine whether voice commands are being interpreted in a manner that results in execution of navigation links and presentation of the desired information specified in the voice commands. The analyst may provide his/her input for use in refining a function used to classify vector input as corresponding to a decision to associate certain keywords and/or voice commands with a particular navigation link presented via the webpage. The vector of measurements corresponding to the review performed by the analyst and the desired outcome corresponding to the analyst's input may be used by the machine learning algorithm to update the function used to classify vector inputs. Such may be performed by multiple analysts and/or using multiple vector inputs to provide the machine learning algorithm a sufficient number of sample vector inputs and desired outputs. The machine learning algorithm may adjust the one or more functions used by the network-connected device 104 to increase the likelihood that the desired result is obtained in future analyses.

The function used to classify measurement vectors may vary in accordance with various embodiments. For example, in some embodiments, support vector machine techniques are used to classify regions in Euclidean space as indicative of a need to associate one or more keywords and/or voice commands with a particular navigation link presented on a webpage. This may be used so that measurements are classified in accordance with the region in which the measurement vectors fall. In yet another embodiment, the machine learning algorithm can utilize decision tree learning to determine a decision (classification, regression) tree used to classify vector input as being indicative of a need to update associations between a navigation link and keywords associated with information accessible through execution of the navigation link or indicative of a need to identify possible voice commands that may be issued to cause invocation of the navigation link based on information accessible through execution of the navigation link. As a fictitious illustrative example, if a minimum requirement established by the network-connected device 104 for associating a navigation link with a set of keywords associated with additional information accessible via execution of the navigation link is that the back navigation rate and/or "stop" commands issued by users does not exceed a particular failure threshold value, the machine learning may result in a decision tree that, at least in part, bifurcates based on vector components indicating whether the failure rate for utilization of the navigation link based on voice commands using these keywords is greater than a threshold failure rate. If the input indicates that the failure rate in presenting accurate information via execution of a navigation link in response to voice commands that include certain keywords exceeds a threshold failure rate, the one or more functions (decision trees) would, in this example, provide a result that the network-connected device 104 is to re-evaluate the updated DOM tree for the webpage to identify an alternative set of keywords to be associated with the navigation link such that voice commands that include a subset of this alternative set of keywords are processed as a request to execute the navigation link. Thus, the machine learning algorithm may adjust the one or more functions if these one or more functions do not indicate that a re-evaluation of the updated DOM tree is required to identify an alternative set of keywords for updating the voice commands that can be interpreted as a request to execute the navigation link.

Figure 2:
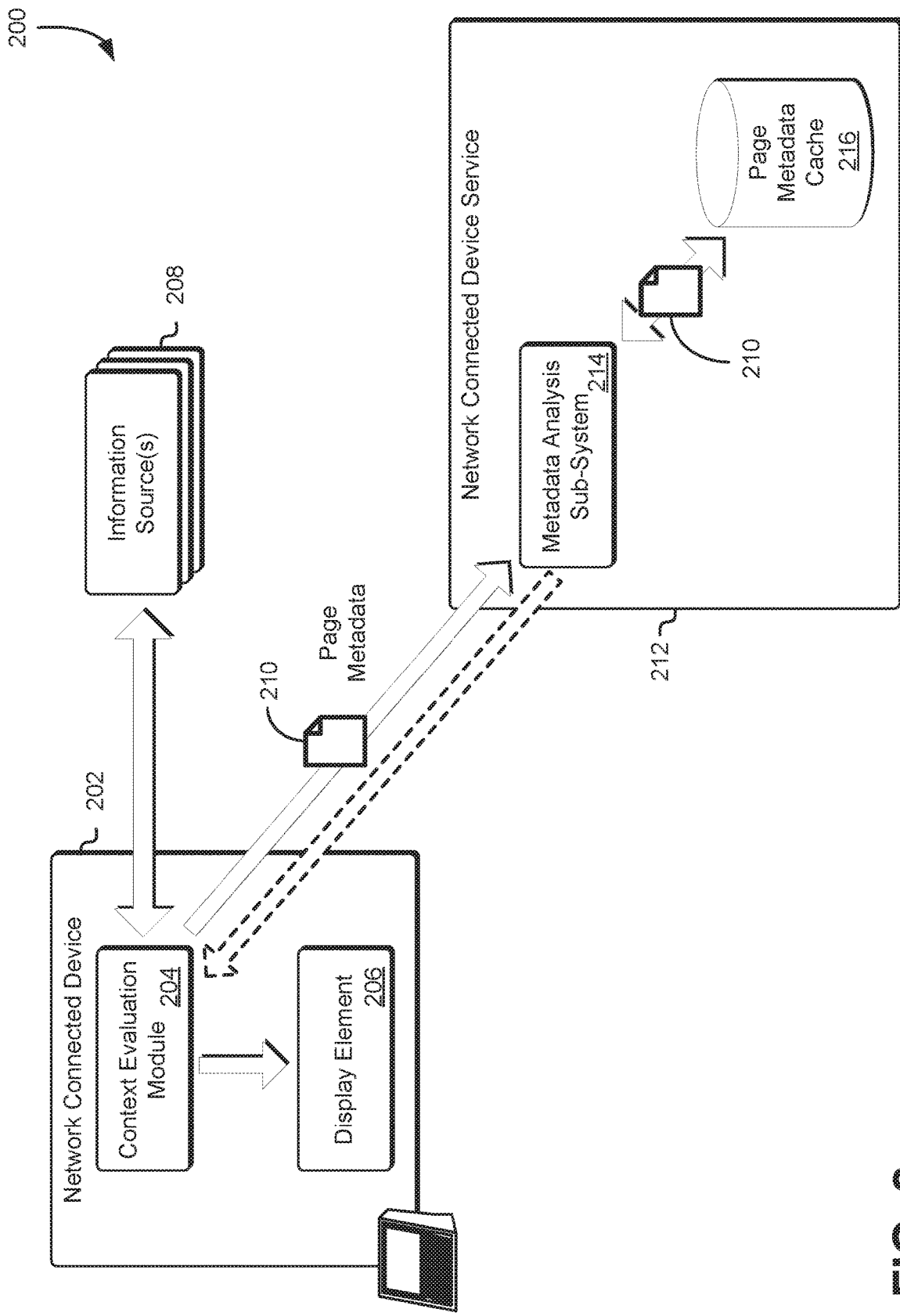
FIG. 2 shows an illustrative example of a system in which a context evaluation module of a network-connected device evaluates information presentable as a result of execution of a navigation link on a webpage to enable interpretation of user commands in accordance with at least one embodiment.

FIG. 2 shows an illustrative example of a system 200 in which a context evaluation module 204 of a network-connected device 202 evaluates information presentable as a result of execution of a navigation link on a webpage to enable interpretation of user commands in accordance with at least one embodiment. In the system 200, a user of a network-connected device 202 utilizes a voice command to request access to a webpage or other information presentable via a display element 206 of the network-connected device 202. The display element 206 may be engaged to the housing of the network-connected device 202 and may be held in place through underlying structural members, such as a washer or other structural support. The display element 206 may be a cathode ray tube display, a light-emitting diode display, an electroluminescent display, an electronic paper display, a plasma display panel, a liquid crystal display, an organic light-emitting diode display, and the like.

In an embodiment, in response to a request to access a particular webpage, the network-connected device 202 may access one or more information sources 208 to obtain the various data elements needed to generate and present the webpage via the display element 206. For instance, a user may request access to a popular news site by name (e.g., "take me to the local newspaper site," etc.), which may cause the network-connected device 202 to identify the URI corresponding to the requested webpage. The network-connected device 202 may utilize this URI, in conjunction with a DNS server, to identify the information sources 208 that maintain the webpages associated with the URI. The information sources 208 may include a set of servers that make available data presentable via display elements of network-connected devices, categorized according to particular keywords or other identifiers (e.g., URIs, etc.).

The network-connected device 202 may include a context evaluation module 204 that may evaluate data provided by the one or more information sources 208 to identify any navigation links or other navigation elements (e.g., JavaScript buttons, etc.) presentable via the display element 206 and usable to access other webpages and content. The context evaluation module 204 may be a process executing on the network-connected device 202 that is operable to process data and information from various information sources 208 to identify navigation links to other information sources. In an embodiment, the context evaluation module 204 generates a DOM tree corresponding to a webpage presentable via the display element 206 to identify one or more navigation links usable to access other information sources and/or to view additional information on the webpage that may be obscured until execution of the navigation links.

In an embodiment, the context evaluation module 204 evaluates the DOM tree of the webpage to identify any nodes corresponding to anchor tags or JavaScript/CSS elements that, when executed, cause navigation links to be presented via the webpage. If the context evaluation module 204 identifies one or more navigation links present within the DOM tree of the webpage, the context evaluation module 204 may generate a copy of the DOM tree for each identified navigation link and determine the impact of executing each navigation link. In an embodiment, the context evaluation module 204 utilizes copy-on-write techniques to fork a copy of the DOM tree of the webpage to evaluate each of the navigation links in parallel. For instance, the context evaluation module 204 may keep each navigation link fork in memory for execution and modification of the copy of the original DOM tree of the webpage.

For each copy of the original DOM tree, the context evaluation module 204 may execute a navigation link to identify the changes to the copy of the DOM tree. For instance, if execution of a navigation link causes additional information to be presented on the webpage, the copy of the DOM tree may be updated to introduce new child nodes corresponding the headers and text corresponding to this additional information. Alternatively, if the execution of a navigation link causes a new webpage to be presented, the context evaluation module 204 may evaluate this new webpage and generate child nodes corresponding to the information presented in this new webpage. In an embodiment, the context evaluation module 204 evaluates the parallel DOM trees generated in response to the execution of the various navigation links on the webpage to identify information accessible through execution of the various navigation links. For instance, the context evaluation module 204 may evaluate new header nodes resulting from execution of a navigation link to determine the context of the additional information accessible through this execution of the navigation link. Additionally, or alternatively, the context evaluation module 204 may evaluate any new DOM tree nodes that specify text corresponding to additional information accessible through execution of the navigation link to identify the context of this additional information.

In an embodiment, the context evaluation module 204 transmits a request to a metadata analysis sub-system 214 of a network connected device service 212 to determine whether there is any metadata associated with the webpage that may have been previously generated by another network-connected device through evaluation of the DOM tree of the webpage. The request may specify a URI of the webpage or other identifying information usable to identify the metadata 210 for the webpage. In response to the request, the metadata analysis sub-system 214 may access a page metadata cache 216 to determine whether the network connected device service 212 maintains metadata 210 associated with webpage that was previously generated by the network-connected device 202 or other client. If the metadata analysis sub-system 214 identifies metadata 210 associated with the webpage specified in the request, the metadata analysis sub-system 214 may provide the metadata 210 to the context evaluation module 204 to fulfill the request. The metadata 210 may specify a modified DOM tree for the webpage, including nodes corresponding to additional information accessible through execution of navigation links on the webpage and/or identifier tokens associated with information accessible via execution of the navigation links. In an embodiment, the metadata 210 further specifies executable instructions for modifying the webpage and/or navigation links to provide additional information and context for each navigation link. The metadata 210 may include keywords associated with information accessible via execution of the navigation links and usable to associate voice commands with requests to execute the navigation links, positional information (e.g., coordinates for identifying locations of additional information or navigation link changes, etc.), and the like. The keywords associated with the information accessible via execution of the navigation link may include actual words and phrases included within the information as well as synonymous words and phrases that may have a similar meaning to the actual words and phrases included within the information. The metadata analysis sub-system 214 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein.

In an embodiment, the context evaluation module 204 evaluates the content presented on the webpage to determine the position of particular features of the webpage, including navigational links. For example, if a webpage includes a set of navigations links, whereby a first navigational link is above certain content and a second navigational link is below certain content, the context evaluation module 204 may identify the position of these navigational links to enable processing of voice commands that include positional information (e.g., "show me information related to the link above the content," etc.). The context evaluation module 204 may also obtain positional information related to additional information presented if any of the navigational links are selected. This positional information may be used to identify voice commands and keywords corresponding to requests to execute particular navigational links presented on the webpage.

Based on the metadata 210 from the metadata analysis sub-system 214 or the evaluation of the webpage, the context evaluation module 204 may update the original DOM tree of the webpage to incorporate the changes identified in the DOM tree copies resulting from execution of the various navigation links of the webpage or otherwise specified in the metadata 210 from the metadata analysis sub-system 214. Using the updated DOM tree for the webpage, the context-evaluation module 204 may identify new voice commands usable to identify and execute any of the navigation links presented on the webpage. In response to the voice command, the context evaluation module 204 may evaluate the updated DOM tree for the webpage to determine which navigation link is to be executed to access the requested information. The context evaluation module 204 may execute the corresponding navigation link and present, via the display element 206 of the network-connected device, the requested information, fulfilling the user's request. In an embodiment, the context evaluation module 204 associates keywords corresponding to the additional information accessible via execution of the navigation links with these new voice commands. These keywords may also include actual words and phrases included within the information as well as synonymous words and phrases that may have a similar meaning to the actual words and phrases included within the information. This enables the context evaluation module 204 to identify additional voice commands that, while not including the actual keywords and phrases of the additional information accessible via execution of a navigation link, may be synonymous to these actual keywords and phrases. Synonymous terms and phrases may include those with a similar dictionary definition, slang terms that share a similar definition to the actual keyword/ phrase, terms and phrases from other dialects/languages that share a similar definition to the actual keyword/phrase, and the like. Thus, in an embodiment, changes to the webpage DOM tree are made without changing the display of the webpage via the display element 206.

In an embodiment, the context evaluation module 204 can replace text associated with a navigation link based on the additional information garnered from evaluation of the navigation link through DOM tree manipulation. This modified navigation link may be presented to a user via the display element 206 of the network connected device 202. A user evaluating the updated webpage via the display element 206 may understand what information may be accessed through execution of the updated navigation link. In an embodiment, the context evaluation module 204 can present, via the display element 206, keywords in the vicinity of each navigation link to allow the user to determine which navigation link to execute. These keywords may correspond to the additional information accessible through execution of each of the navigation links presented on the webpage.

In an embodiment, the context evaluation module 204 transmits metadata 210 associated with the evaluation of the webpage and corresponding navigation links to the metadata analysis sub-system 214 of the network connected device service 212. The metadata analysis sub-system 214 may evaluate the provided metadata 210 to identify keywords and/or new voice commands usable to invoke the navigation links based on evaluation of the copies of the DOM tree generated by the context evaluation module 204. The metadata analysis sub-system 214 may access the page metadata cache 216 to determine whether metadata associated with the webpage has been previously created. If so, the metadata analysis sub-system 214 may compare the webpage metadata 210 provided by the context evaluation module 204 and the stored metadata to identify any changes to the metadata. These changes may be promulgated as a result of one or more changes to the webpage by the one or more information sources 208. In an embodiment, the metadata analysis sub-system determines the efficacy of associating these keywords and/or voice commands with execution of the navigation links. For instance, one or more analysts employed by the network-connected device service 212 or the metadata analysis sub-system 214 may analyze the results from the one or more analyses performed by the context evaluation module 204 through use of the one or more functions described above. For instance, an analyst may review the metadata 210 generated as a result of execution of the navigation links of a webpage and the one or more vectors generated by the context evaluation module 204 to determine whether particular voice commands or keywords utilized by users would cause a navigation link to be executed and, if so, whether information requested by these users is accessed as a result. The analyst may provide his/her input for use in refining a function used to classify vector input as corresponding to a decision to associate certain keywords and/or voice commands with a particular navigation link presented via the webpage. The vector of measurements corresponding to the review performed by the analyst and the desired outcome corresponding to the analyst's input may be used by the machine learning algorithm to update the function used to classify vector inputs. Such may be performed by multiple analysts and/or using multiple vector inputs to provide the machine learning algorithm a sufficient number of sample vector inputs and desired outputs. The machine learning algorithm may adjust the one or more functions used by the context evaluation module 204 to increase the likelihood that the desired result is obtained in future analyses.

The network-connected device service 212, through the metadata analysis sub-system 214, may cache or otherwise store this metadata 210 for use by other network-connected devices or clients accessing the webpage. For instance, a network-connected device accessing the webpage may transmit a request to the network-connected device service 212 to determine whether any metadata associated with the webpage is available for use. If so, the network-connected device may obtain this metadata from the metadata analysis sub-system 214. The network-connected device may use the metadata and initial response headers (e.g., e-tag, content length, etc.) to verify that the additional information accessible via the navigation links of the webpage would be the same if navigated to. The metadata 210 may include an identifier generated via a hash of the data corresponding to the nodes of the DOM tree of the webpage or other content loaded on to the network-connected device 202. Thus, the network-connected device service 212 may store the metadata in association with this hash. A network-connected device 202 may thus query the network-connected device service 212 by transmitting a request for metadata associated with a hash of the webpage or other content presented via a display element 206 of the network-connected device 202 as well as a URI of the webpage presented.

Figure 3:
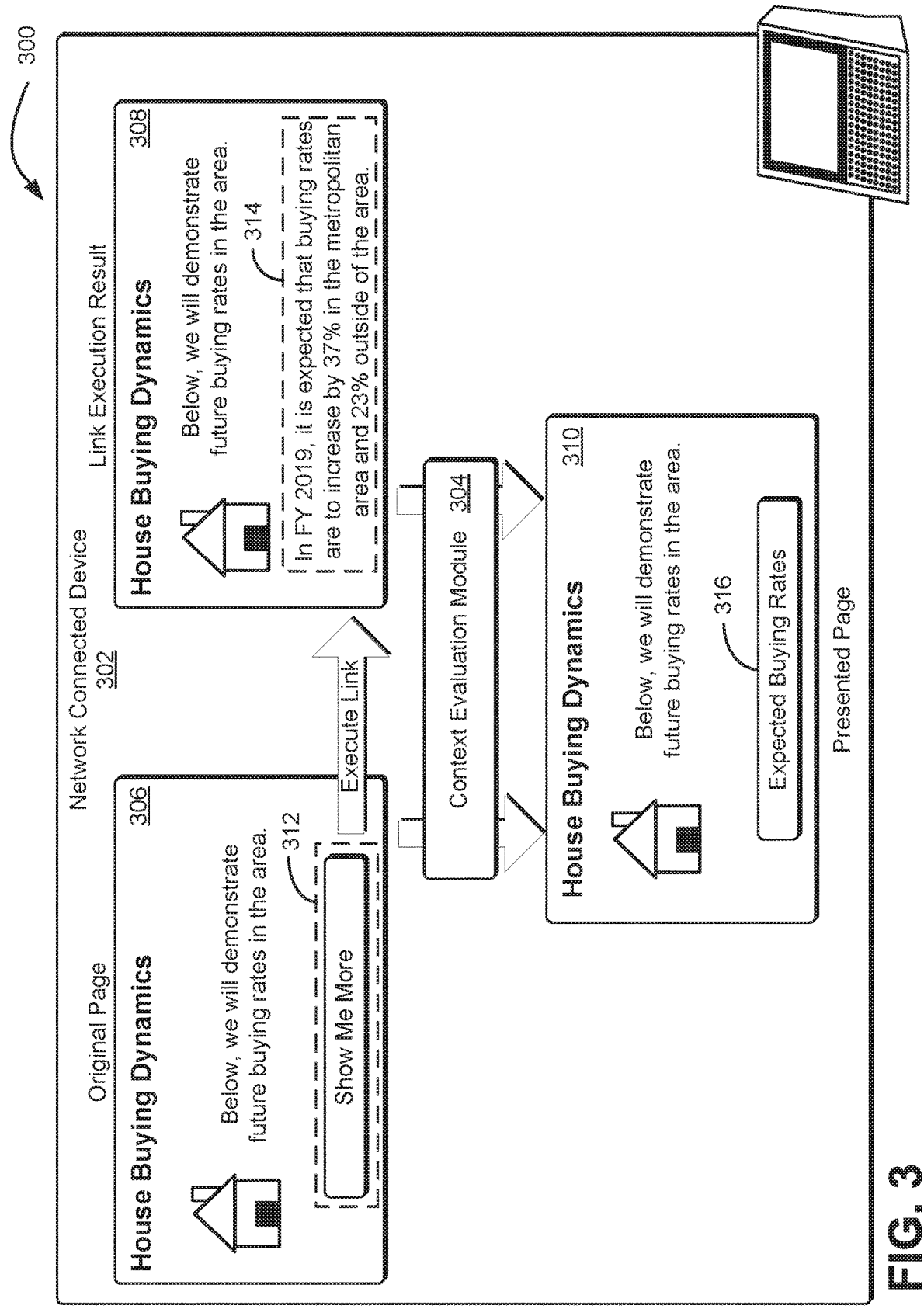
FIG. 3 shows an illustrative example of a system in which a context evaluation module updates the content of a navigation link presented on a webpage based on information presentable as a result of execution of the navigation link in accordance with at least one embodiment.

As noted above, a context evaluation module of a network-connected device may evaluate a DOM tree of a webpage presented on a display element of the network-connected device to identify any navigation links that may be present. If the context evaluation module identifies a navigation link in the DOM tree, the context evaluation module may execute the navigation link to determine what changes are incurred on the webpage. For instance, execution of a navigation link may cause additional information to be presented on the webpage. Alternatively, execution of a navigation link may cause a new webpage to be accessed. In either case, the context evaluation module may evaluate the additional information accessed as a result of execution of the navigation link and determine what changes to the DOM tree of the webpage are made. Based on these changes, the context evaluation module may identify the context of the additional information. This context may be used to identify keywords and/or voice commands that, if detected, may indicate a request to execute the navigation link and present the additional information. In an embodiment, the context can also be used to update the text of the navigation link to enable a user to determine what additional information is to be presented through execution of the navigation link. Accordingly, FIG. 3 shows an illustrative example of a system 300 in which a context evaluation module 304 updates the content of a navigation link 312 presented on a webpage 306 based on information presentable as a result of execution of the navigation link 312 in accordance with at least one embodiment.

In the system 300, the context evaluation module 304 of a network-connected device 302 detects loading of a webpage 306 on to the display element of the network-connected device 302. The webpage 306 may include a variety of elements, which may be represented as individual nodes in a DOM tree for the webpage 306. For instance, as illustrated in FIG. 3, the webpage 306 may include a title, an image, descriptive text, and a navigation link 312 (e.g., "Show Me More" button). The navigation link 312, if executed, may result in additional information 314 being presented on the webpage 306. However, the text presented on the navigation link 312 may not provide an indication of what additional information 314 may be accessed as a result of execution of the navigation link 312.

In an embodiment, the context evaluation module 304 of the network-connected device 302 generates a DOM tree corresponding to the webpage 306. This DOM tree may include one or more nodes that represent the navigation link 312. The context evaluation module 304 may identify the nodes corresponding to the navigation link 312 and, in response to this identification, may generate a copy of the DOM tree. This copy of the DOM tree may be used by the context evaluation module 304 to determine any changes to the DOM tree resulting from execution of the navigation link 312. For instance, as illustrated in FIG. 3, execution of the navigation link 312 results in additional information 314 being presented on an updated webpage 308 in place of the navigation link 312. The DOM tree corresponding to this updated webpage 308 may also include new nodes corresponding to this additional information 314, whereas the nodes corresponding to the navigation link 312 may be removed or otherwise obscured.

The context evaluation module 304 may evaluate the updated DOM tree corresponding to the updated webpage 308 to identify the differences between this updated DOM tree and the original DOM tree of the webpage 306. Based on these differences, the context evaluation module 304 may determine what changes may be made to the webpage 306 to provide greater context for the navigation link 312. In an embodiment, the context evaluation module 304 evaluates the additional information 314 accessible via execution of the navigation link 312 to identify keywords that are usable to identify the context of the additional information 314. For example, as illustrated in FIG. 3, the context evaluation module 304 may evaluate the additional information 314 and determine that the additional information 314 relates to the expected buying rates for a particular area. Using these identified keywords corresponding to the additional information 314, the context evaluation module 304 may update the navigation link 312 to include these keywords, resulting in an updated navigation link 316. For example, as illustrated in FIG. 3, the navigation link 312 is updated to include the keywords "Expected Buying Rates," resulting in an updated navigation link 316 that may be presented in an updated webpage 310.

It should be noted that while replacement of text on a navigation link is described extensively for illustrative purposes, other changes to the navigation link or to the webpage itself may be made to provide greater context as to the additional information accessible via execution of the navigation link. For example, instead of replacing the text of a navigation link to include keywords associated with the additional information accessible via execution of the navigation link, the context evaluation module 304 may cause the keywords to be presented in the vicinity of the navigation link if the user highlights the navigation link or otherwise issues a voice command to describe the navigation link in more detail. As another alternative, the context evaluation module 304 may update the webpage to include a portion of the additional information or otherwise a statement demonstrating the context of the additional information accessible via execution of the navigation link. For example, using the additional information 314 illustrated in FIG. 3, the context evaluation module 304 may add a statement before the navigation link 312 describing the information available through execution of the navigation link 312 (e.g., "Click the link below to see expected buying rates," etc.).

Figure 4:
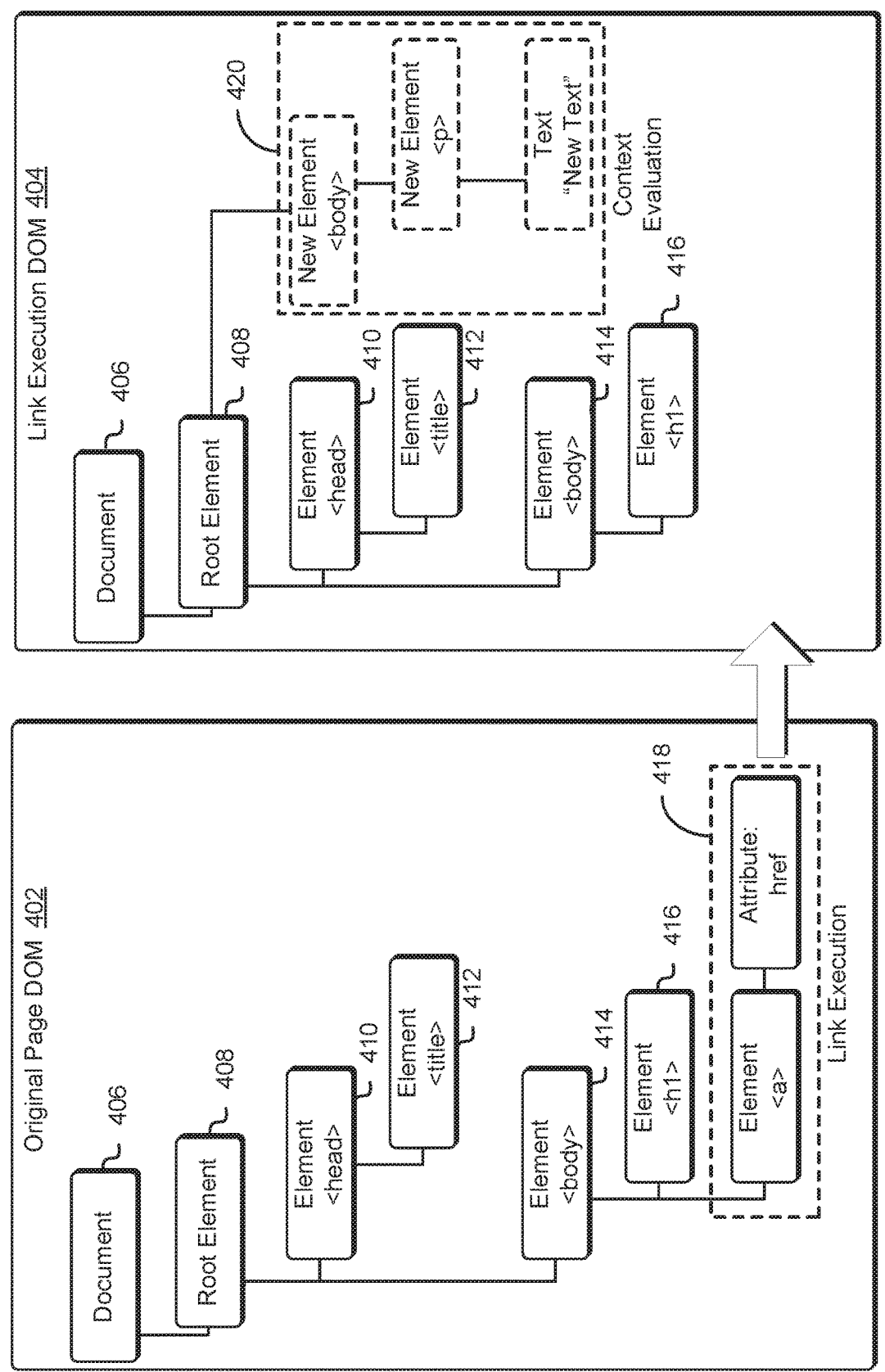
FIG. 4 shows an illustrative example of a system in which a Document Object Model (DOM) for a webpage is temporarily modified based on execution of navigation links within the webpage to identify any changes to the webpage for use in processing voice commands related to content of a webpage in accordance with at least one embodiment.

As noted above, a context evaluation module may generate a DOM tree of a webpage to identify any navigation links that may be presented via the webpage. If there is a navigation link present on the webpage, the context evaluation module may create a copy of the DOM tree. Using this copy of the DOM tree, the context evaluation module may execute the navigation link and identify any changes to the DOM tree resulting from execution of the navigation link. Based on the changes to the DOM tree, the context evaluation module may determine the context of these changes and identify keywords and/or voice commands that may be associated with navigation link. Thus, if a voice command is issued that includes a subset of the keywords identified by the context evaluation module or that matches one of the voice commands associated with the navigation link, the network-connected device may execute the navigation link. The original DOM tree may be updated to include identifier tokens corresponding to these keywords and/or voice commands associated with the navigation link. For instance, the context evaluation module may use copy-on-write techniques to fork a copy of the DOM tree to evaluate each of the navigation links in parallel. The context evaluation engine may keep each navigation link fork in memory for execution and modification of the copy of the original DOM tree of the webpage. Accordingly, FIG. 4 shows an illustrative example of a system 400 in which a DOM tree 402 for a webpage is temporarily modified based on execution of navigation links within the webpage to identify any changes to the webpage for use in processing voice commands related to content of a webpage in accordance with at least one embodiment.

In the system 400, a context evaluation engine may generate a DOM tree 402 corresponding to a webpage presented via a display element of the network-connected device. The DOM tree 402 may include a set of nodes corresponding to DOM node class types that represent the various elements of the webpage. For instance, the DOM tree 402 may include a document node 406, which may represent the entire document or webpage presented by the network-connected device via the display element. This document node 406 may have a root element node 408 as a child node. The root element node 408 may enclose all other elements of the webpage and is, thus, the sole parent element (node) for all other subsequent elements (nodes) of the DOM tree 402.

The DOM tree 402 may include a <head> element node 410, which may be a container for metadata of the webpage. The metadata for the webpage may not be displayed via the display element of the network-connected device. The metadata defined via the <head> element node 410 may define the webpage title, character set, webpage styles, navigation links, any programmatic scripts, and other information related to the content of the webpage. As such, the <head> element node 410 may include one or more child nodes, including a <title> element node 412. The <title> element node 412, which may represent the title of the document (e.g., webpage), may be required in an HTML document.

In addition to the <head> element node 410, the DOM tree 402 may include a <body> element node 414, which may be a child node from the root element node 408. The <body> element node 414 may include the contents of the webpage, such as text, navigation links, images, data tables, data lists, and the like. Since the <body> element node 414 may define the body of the webpage, the <body> element node 414 may have one or more child nodes representing the various elements of the webpage. For instance, as illustrated in FIG. 4, the <body> element node 414 has a <h1> element node 416 as a child node. The <h1> element node 416 may define a first heading on the webpage and may define the most important heading of the webpage. The <h1> element node 416 may define the parameters of the heading, including (but not limited to) the font size, font color, font weight, margin measurements, and the like. The DOM tree 402 may include various heading element nodes, including the <h1> element node 416, with subsequent heading element nodes labeled in numerical order (e.g., <h1>, <h2>, <h3>, etc.). Each heading element node may define an individual heading on the webpage and may have different font and margin settings.

As illustrated in FIG. 4, the DOM tree 402 may also include, as child nodes of the <body> element node 414, one or more navigation link nodes 418. The one or more navigation link nodes 418 may include an anchor element node (e.g., <a> tag node) that defines a navigation link for accessing other webpages. This anchor element node may have a child node defined as a href attribute node. The href attribute node may indicate the destination of the navigation link, which may be defined as a URI of the webpage to be accessed via execution of the navigation link. It should be noted that while HTML anchor tags are described above for the purpose of illustration, other types of navigation links may be represented via the DOM tree 402. For instance, one or more JavaScript nodes may be included in the DOM tree 402 to represent buttons that, when selected, result in additional information being presented on the webpage.

In an embodiment, a context evaluation module evaluates the DOM tree 402 of the webpage to identify any navigation links 418 present on the webpage. If a navigation link 418 is present within the webpage, and represented in the DOM tree 402, the context evaluation module generates a copy of the DOM tree 404. Using the copy of the DOM tree 404, the context evaluation module may execute the navigation link and identify any changes to the copy of the DOM tree 404. For example, as illustrated in FIG. 4, execution of the navigation link 418 results in presentation of additional information 420 that may be available for evaluation by the context evaluation module. The additional information 420 may be represented in the copy of the DOM tree 404 with a new <body> element node and new child nodes, including a <p> element node and a text element node, which represents new body text added to the webpage as a result of execution of the navigation link 418. The additional information 420 may be represented in different ways depending on the nodes that represent the navigation link 418. In an embodiment, execution of the navigation link is performed without changing the display of the webpage via the display element of the network-connected device.

The context evaluation module may evaluate the additional information 420 in the copy of the DOM tree 404 to determine the context of this additional information 420. Based on information included in the new nodes of the copy of the DOM tree 404, the context evaluation module may identify keywords that, if utilized in a voice command, may cause execution of the navigation link to present the additional information 420. Similarly, the context evaluation module may identify new voice commands that may be used to request execution of the navigation link. In some instances, the context evaluation module may determine what changes, if any, may be made to the webpage to provide greater context for the navigation link 418. In an embodiment, the context evaluation module uses the identified keywords corresponding to the additional information 420 to update the DOM tree 402 to include these keywords in conjunction with the navigation link 418. For instance, the context evaluation module may include, within the navigation link nodes within the DOM tree 402, an identifier token usable to identify other nodes presentable via execution of the navigation link. The identifier token may also specify the identified keywords and/or voice commands usable to detect a request to execute the navigation link 418. Alternatively, the context evaluation module may replace the navigation link 418 within the DOM tree 402 with new nodes that may include text or other information associated with the additional information 420 identified via the copy of the DOM tree 404.

Figure 5:
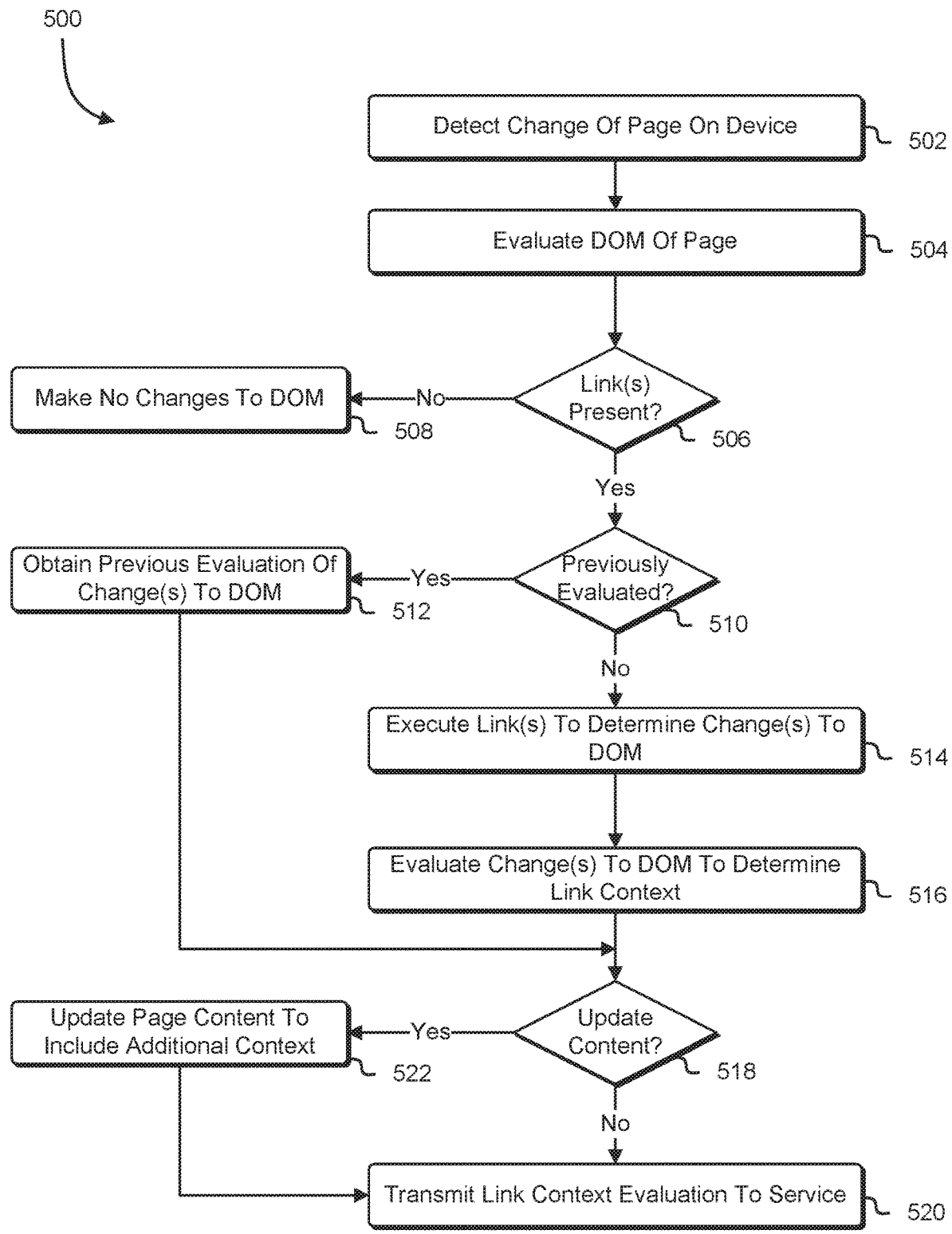
FIG. 5 shows an illustrative example of a process for evaluating changes to the webpage resulting from execution of navigation links present on the webpage to determine methods for processing voice commands in accordance with an embodiment.

FIG. 5 shows an illustrative example of a process 500 for evaluating changes to the webpage resulting from execution of navigation links present on the webpage to determine methods for processing voice commands in accordance with an embodiment. The process 500 may be performed by a context evaluation module or other application/process executed by a network-connected device that may evaluate webpages and execute navigation links to identify keywords and/or voice commands usable to identify requests to execute a navigation link on a webpage presented via the network-connected device. In an embodiment, the context evaluation module detects 502 loading or other change of a webpage onto a display element of the network-connected device. For instance, the context evaluation module may identify data being received by the network-connected device as being associated with a webpage that is to be presented via the network-connected device. Alternatively, the context evaluation module may identify new information or content being loaded on to an existing webpage presented via the network-connected device. The context evaluation module may also evaluate any voice commands from users of the network-connected device. For instance, if a user issues a voice command to request navigation to a particular webpage, the context evaluation module may determine that a webpage is to be loaded onto the display element of the network-connected device.

If the context evaluation module detects that a webpage has been loaded on to the network-connected device, the context evaluation module may construct a DOM tree that represents the relationships among the various elements of the webpage. The context evaluation module may evaluate 504 the DOM tree of the webpage to identify any navigation links that may be present on the webpage. For instance, the DOM tree may include an anchor element node corresponding to an HTML navigation link. Additionally, or alternatively, the DOM tree may include one or more JavaScript nodes corresponding to a navigation link on the webpage that, if executed, may cause additional information to be presented on the webpage. Based on this evaluation of the DOM tree, the context evaluation module may determine 506 whether there are any navigation links present within the DOM tree. If the context evaluation module determines that there are no navigation links present within the DOM tree, the context evaluation module may make 508 no changes to the DOM tree of the webpage.

In an embodiment, if the context evaluation module determines that there are one or more navigation links present within the DOM tree of the webpage, the context evaluation module determines 510 whether these navigation links have been previously evaluated by the network-connected device or other client. For example, the context evaluation module may transmit a request to a network-connected device service to determine whether there is any webpage metadata corresponding to a previous evaluation of the webpage. The request may include the original DOM tree for the webpage or an identifier corresponding to the webpage itself (e.g., URI of the webpage, header information, etc.). In response to the request, the network-connected device service may evaluate the original DOM tree or other identifier to determine whether any metadata is available corresponding to this DOM tree. If so, the network-connected device service may transmit the available metadata to the context evaluation module. Otherwise, the network-connected device service may indicate that there has been no previous evaluation of the webpage. Thus, if the webpage has been previously evaluated by another network-connected device or client, the context evaluation module may obtain 512 metadata corresponding to this previous evaluation and changes to the webpage.

If the DOM tree of the webpage has not been previously evaluated, the context evaluation module may generate a copy of the DOM tree for each navigation link present and execute 514 the navigation links to determine the one or more changes to the webpage (e.g., each copy of the DOM tree) resulting from execution of the navigation links. The context evaluation module may evaluate 516 the changes to the webpage to determine the context behind each of the navigation links. For instance, if execution of a navigation link results in additional information being presented via the webpage, the context evaluation module may evaluate this additional information to identify any keywords that may serve as an indication regarding the subject matter of the additional information. Similarly, if execution of a navigation link directs the network-connected device to a new webpage, the context evaluation module may evaluate the DOM tree of this new webpage to identify any headings or text that can be used to determine the subject matter of this new webpage.

In an embodiment, based on evaluation of the changes to the webpage stemming from execution of the navigation links on the webpage or on the previous evaluation obtained from the network-connected device service, the context evaluation module identifies one or more keywords and/or voice commands usable to indicate a request to execute a navigation link of the webpage. The context evaluation engine may update the DOM tree of the webpage to include one or more identifier tokens corresponding to alternative versions of the DOM tree that may include the additional information accessible via execution of the navigation links. Additionally, or alternatively, the context evaluation engine may associate the keywords and/or voice commands with particular navigation links. Thus, if a user issues a voice command that includes a subset of the keywords or matches one of the voice commands associated with a navigation link, the network-connected device may interpret the voice command as being a request to execute the navigation link.

Based on evaluation of the changes to the webpage stemming from execution of the navigation links on the webpage or on the previous evaluation obtained from the network-connected device service, the context evaluation module may determine 518 whether to update the content of the webpage to include additional context for the navigation links. For instance, the context evaluation module may determine that additional keywords and voice commands may be associated with a navigation link without changing the display of the webpage on the network-connected device. Alternatively, the context evaluation module may update 522 the content of the webpage to include additional keywords or information based on its evaluation of the navigation links. For instance, the context evaluation module may update the original DOM tree of the webpage to incorporate the changes identified in the DOM tree copies resulting from execution of the various navigation links of the webpage.

Using the updated DOM tree for the webpage, the context evaluation module may identify new voice commands usable to identify and execute any of the navigation links presented on the webpage. For instance, if execution of the navigation link would result in additional information being presented about the expected buying rates in an area, the user may issue a voice command that indicates a desire to access this additional information. In response to the voice command, the network-connected device may evaluate the updated DOM tree for the webpage to determine which navigation link is to be executed to access the requested information. The network-connected device may execute the corresponding navigation link and present, via the display element of the network-connected device, the requested information, fulfilling the user's request. Alternatively, the context evaluation module may evaluate the additional information accessible via execution of the navigation link to identify keywords that are usable to identify the context of the additional information. Using these identified keywords corresponding to the additional information, the context evaluation module may update the navigation link to include these keywords, resulting in an updated navigation link.

In an embodiment, the context evaluation module transmits 520 metadata associated with the evaluation of the webpage and corresponding navigation links to a network-connected device service or other remote service. The network-connected device service or other remote service may cache or otherwise store this metadata for use by other network-connected devices or clients accessing the webpage. For instance, a network-connected device accessing the webpage may transmit, via the context evaluation module, a request to the network-connected device service or other remote service to determine whether any metadata associated with the webpage is available for use. If so, the context evaluation module may obtain this metadata from the network-connected device service or other remote service. The context evaluation module may use the metadata and initial response headers (e.g., e-tag, content length, etc.) to verify that the additional information accessible via the navigation links of the webpage would be the same if navigated to. Thus, this metadata may be utilized by other network-connected devices and other clients to perform the evaluation described herein.

Figure 6:
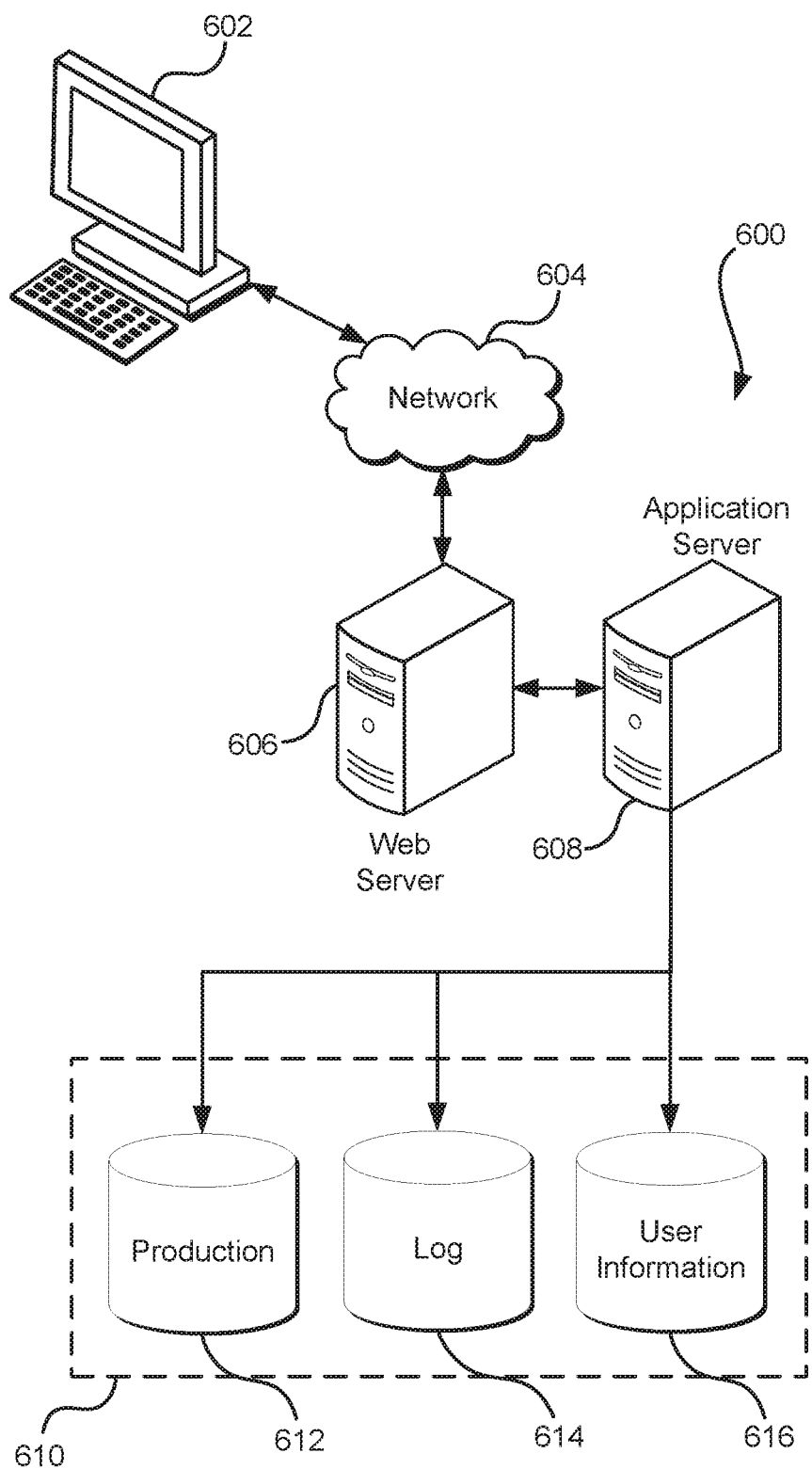
FIG. 6 illustrates a system in which various embodiments can be implemented.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 602 and the application server 608, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto and the application server 608 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a document object model (DOM) of a webpage, the webpage comprising a set of navigation links;
   selecting a navigation link from the set of navigation links;
   modifying a copy of the DOM to include contextual information from a webpage associated with the navigation link, the contextual information obtained by executing the selected navigation link;
   identifying the contextual information within the modified copy of the DOM that serves as an indication of subject matter of the webpage associated with the navigation link;
   and fulfilling a voice command to navigate to the webpage associated with the navigation link by using the contextual information to match the voice command to the navigation link.

2. The computer-implemented method of claim 1, further comprising modifying the code of the webpage to present the contextual information via the webpage.

3. The computer-implemented method of claim 1, further comprising:
   generating metadata associated with the navigation link, the metadata comprising information operable to determine the contextual information of the navigation link.

4. The computer-implemented method of claim 1, wherein modifying the copy of the DOM includes replacing the navigation link with information presentable via the webpage.

* * * * *